(12) United States Patent
Sakai et al.

(10) Patent No.: US 11,695,141 B2
(45) Date of Patent: Jul. 4, 2023

(54) FUEL CELL SYSTEM

(71) Applicant: HONDA MOTOR CO., LTD., Tokyo (JP)

(72) Inventors: Ryoji Sakai, Wako (JP); Kazuhide Inoue, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 17/582,433

(22) Filed: Jan. 24, 2022

(65) Prior Publication Data

US 2022/0238899 A1    Jul. 28, 2022

(30) Foreign Application Priority Data

Jan. 25, 2021    (JP) .................................. 2021-009441

(51) Int. Cl.
| | |
|---|---|
| *H01M 8/04* | (2016.01) |
| *H01M 8/04701* | (2016.01) |
| *H01M 8/2465* | (2016.01) |
| *H01M 8/04858* | (2016.01) |
| *H01M 8/04089* | (2016.01) |
| *H01M 8/04746* | (2016.01) |

(52) U.S. Cl.
CPC ... *H01M 8/04701* (2013.01); *H01M 8/04089* (2013.01); *H01M 8/04753* (2013.01); *H01M 8/04858* (2013.01); *H01M 8/2465* (2013.01)

(58) Field of Classification Search
CPC ......... H01M 8/04701; H01M 8/04858; H01M 8/04089; H01M 8/04753; H01M 8/2465
USPC ......................................................... 429/456
See application file for complete search history.

(56) References Cited

U.S. PATENT DOCUMENTS

| | | | | |
|---|---|---|---|---|
| 2018/0294491 A1* | 10/2018 | Ito | ..................... | H01M 8/04291 |
| 2019/0190049 A1* | 6/2019 | Ishitoya | ............ | H01M 8/04007 |
| 2019/0363379 A1* | 11/2019 | Son | ..................... | H01M 8/04746 |
| 2020/0203739 A1* | 6/2020 | Kaneko | ............. | H01M 8/04753 |
| 2021/0013529 A1* | 1/2021 | Toida | ................. | H01M 8/04231 |

FOREIGN PATENT DOCUMENTS

| | | |
|---|---|---|
| JP | 2006-134647 A | 5/2006 |
| JP | 2006-156280 A | 6/2006 |
| JP | 2007-103224 A | 4/2007 |
| JP | 2010-003496 A | 1/2010 |
| JP | 2014-056771 A | 3/2014 |
| JP | 2020-009598 A | 1/2020 |

OTHER PUBLICATIONS

Office Action dated Nov. 8, 2022 issued over the corresponding Japanese Patent Application No. 2021-009441 with the English translation thereof.

Office Action dated Apr. 18, 2023 issued in the corresponding Japanese Patent Application 2021-009441 with the English translation thereof.

\* cited by examiner

*Primary Examiner* — James M Erwin
(74) *Attorney, Agent, or Firm* — Carrier Shende & Associates, P.C; Joseph P. Carrier; Fulchand P. Shende

(57) ABSTRACT

An ECU of a fuel cell system supplies cathode gas by rotating an air pump at a low-load rotational speed and performs a low-load power generation in a fuel cell stack, while a moving body is traveling. When the fuel cell stack generates power while the moving body is stopped, the ECU increases the supply amount of the cathode gas by rotating the air pump at a during-stoppage-of-traveling rotational speed which is greater than the low-load rotational speed.

8 Claims, 9 Drawing Sheets

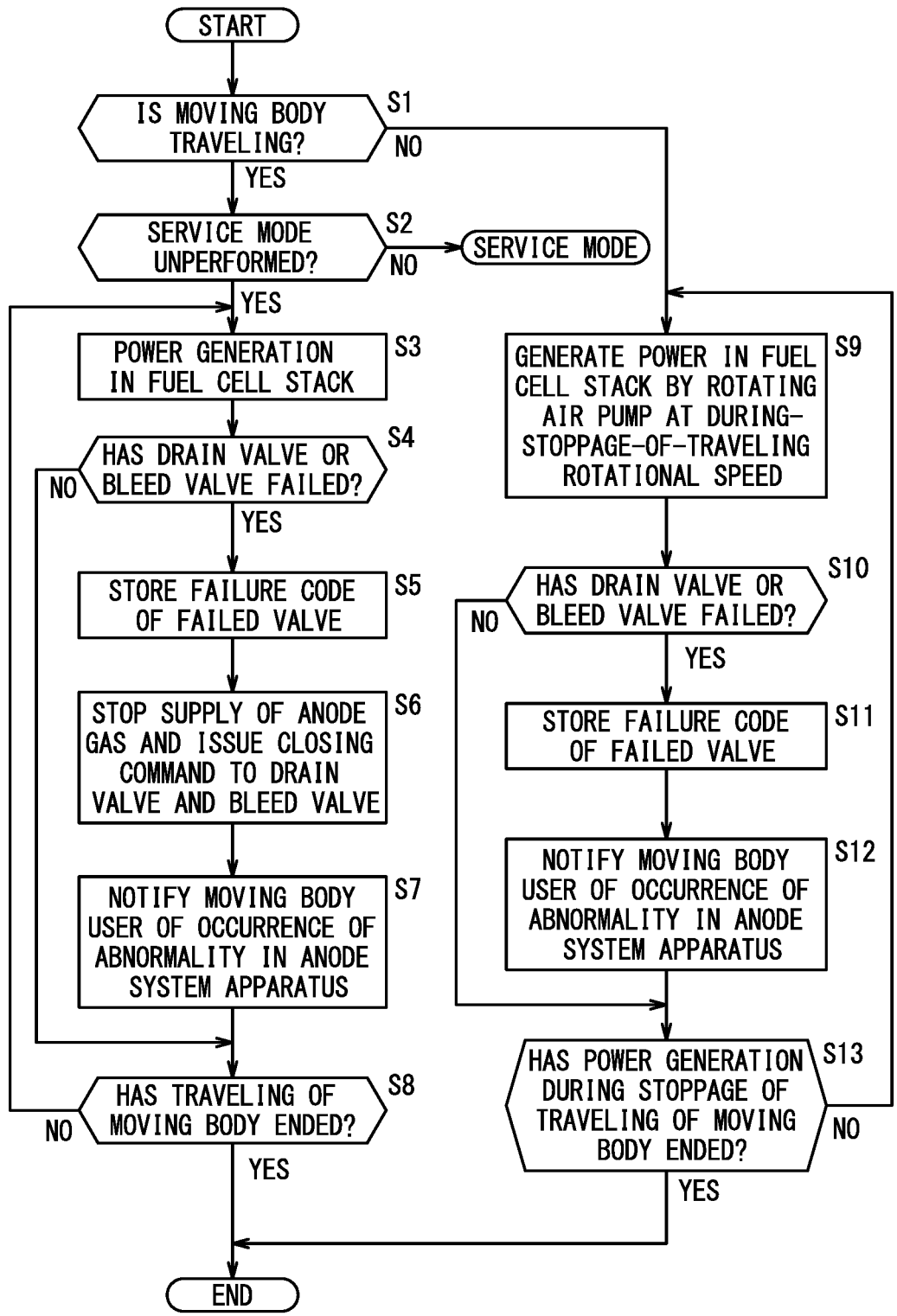

FUEL CELL SYSTEM

CROSS-REFERENCE TO RELATED APPLICATIONS

This application is based upon and claims the benefit of priority from Japanese Patent Application No. 2021-009441 filed on Jan. 25, 2021, the contents of which are incorporated herein by reference.

BACKGROUND OF THE INVENTION

Field of the Invention

The present invention relates to a fuel cell system mounted on a moving body and which generates power.

Description of the Related Art

In a fuel cell system mounted on a moving body such as a fuel cell vehicle, anode off-gas containing anode gas (hydrogen gas) not used for power generation inside a fuel cell stack is discharged to the outside of the moving body. In order to prevent the anode gas from catching fire, the fuel cell system typically has a diluter that dilutes the discharged anode gas.

This type of diluter causes the increased size of the fuel cell system. Therefore, J P 2020-009598 A discloses a fuel cell system without a diluter. In this fuel cell system, when power generation is stopped, the anode off-gas discharged from the fuel cell stack is returned to the anode supply path. The anode gas passes through the membrane electrode assembly, moves from the anode path to the cathode path, is diluted by the cathode gas in the cathode path, and is discharged to the outside.

SUMMARY OF THE INVENTION

In a fuel cell system, water generated at a cathode by power generation of the fuel cell stack is discharged to an anode system apparatus. However, in the fuel cell system disclosed in JP 2020-009598 A, a means for discharging the generated water discharged to the anode system apparatus is not considered. The fuel cell system needs to discharge the generated water that has flowed out to the anode system apparatus, and at the time of discharge, the anode gas is also discharged. Therefore, there is a problem that the anode gas cannot be sufficiently diluted in a situation where the moving body is traveling or stopped, only by guiding the anode gas to the cathode path at the stoppage of power generation.

An object of the present invention is to solve the aforementioned problem.

According to an aspect of the present invention, there is provided a fuel cell system provided in a moving body, including: a fuel cell stack; an air pump configured to supply cathode gas to the fuel cell stack; a cathode discharge path through which cathode off-gas is discharged from the fuel cell stack; an anode path configured to allow anode gas to flow through the fuel cell stack; one or more discharge paths configured to guide the anode gas of the anode path to the cathode discharge path; and a control device configured to control operation of the air pump, wherein the control device is configured to: while the moving body is traveling, supply the cathode gas by rotating the air pump at a low-load rotational speed and perform a low-load power generation in the fuel cell stack; and in a case where power generation of the fuel cell stack is performed while the moving body is stopped, increase a supply amount of the cathode gas by rotating the air pump at a travel-stopping rotational speed (a during-stoppage-of-traveling rotational speed), which is greater than the low-load rotational speed.

In the fuel cell system described above, by adjusting the supply amount of the cathode gas according to the situation, the appropriately diluted anode gas can be discharged to the outside of the moving body.

The above and other objects features and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 7 is a flowchart illustrating a process flow of a cathode gas supply method;

DESCRIPTION OF THE INVENTION

Figure 1:
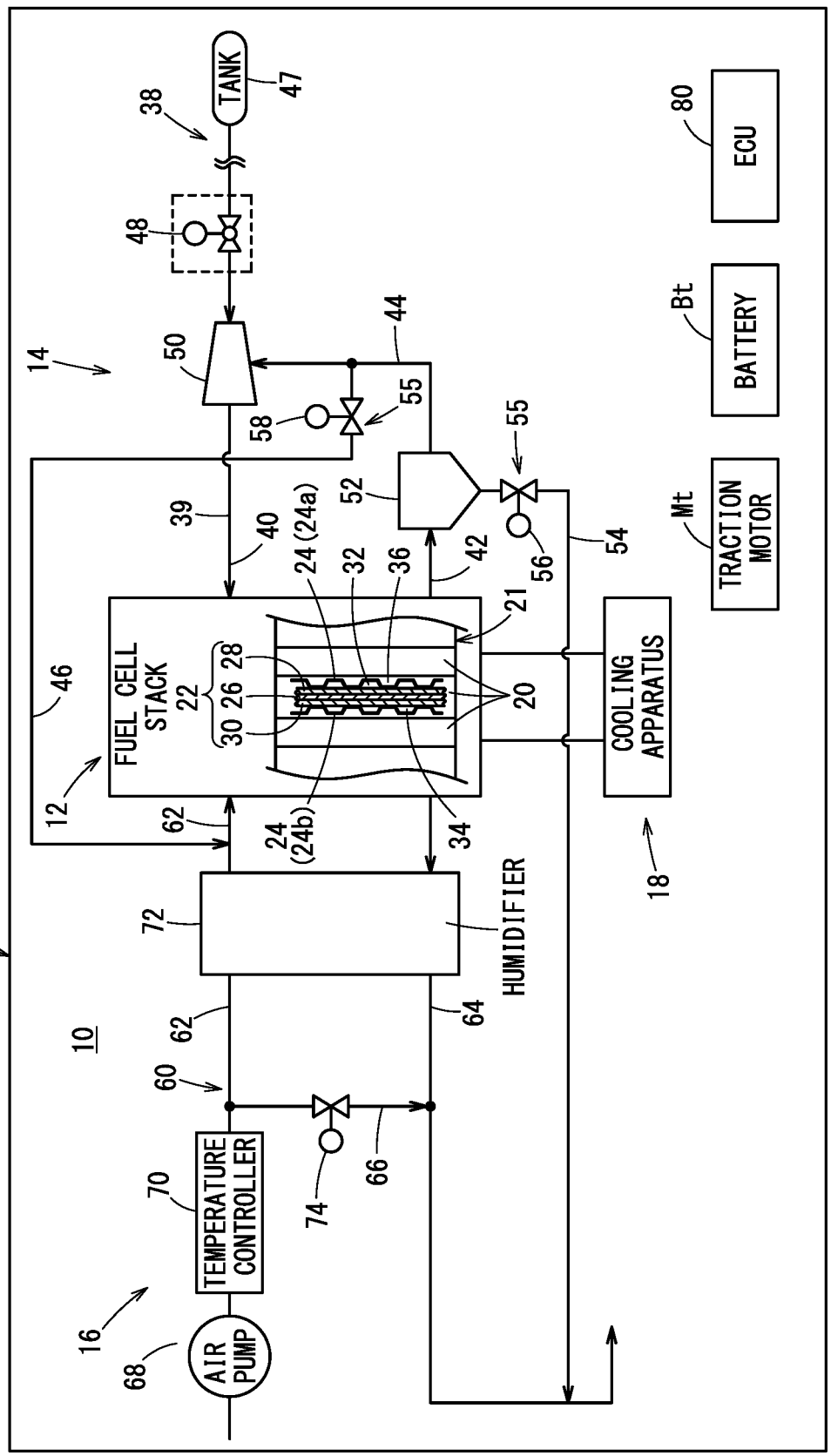
FIG. 1 is an explanatory view schematically showing an overall configuration of a fuel cell system mounted on a moving body according to an embodiment of the present invention.

As shown in FIG. 1, a fuel cell system 10 according to an embodiment of the present invention includes a fuel cell stack 12, an anode system apparatus 14, a cathode system apparatus 16, and a cooling apparatus 18. The fuel cell system 10 is mounted on a moving body 11 such as a fuel cell vehicle. The fuel cell system 10 supplies electric power generated by the fuel cell stack 12 to a battery Bt, a traction motor Mt, and the like, of the moving body 11. Note that the moving body 11 on which the fuel cell system 10 is mounted is not limited to a fuel cell vehicle, and may be another vehicle, a ship, an aircraft, a robot, or the like.

In the fuel cell stack 12, a stack body 21 in which a plurality of power generation cells 20 are stacked is housed in a stack case (not shown). Each power generation cell 20 generates power by an electrochemical reaction between an anode gas (a fuel gas such as hydrogen) and a cathode gas (an oxygen-containing gas such as air).

Each power generation cell 20 includes a membrane electrode assembly 22 (hereinafter referred to as a "MEA 22") and a pair of separators 24 (24a, 24b) sandwiching the MEA 22. The MEA 22 includes an electrolyte membrane 26, an anode 28 provided on one surface of the electrolyte membrane 26, and a cathode 30 provided on the other surface of the electrolyte membrane 26. The electrolyte membrane 26 is, for example, a solid polymer electrolyte membrane (cation exchange membrane). In the separator 24a, an anode gas flow field 32 through which the anode gas flows is formed on one surface of the MEA 22. In the separator 24b, a cathode gas flow field 34 through which the cathode gas flows is formed on the other surface of the MEA 22. In addition, by stacking the plurality of power generation cells 20, a coolant flow field 36 through which a coolant flows is formed between the surfaces of the separator 24a and the separator 24b facing each other.

Further, each power generation cell 20 includes a plurality of passages (an anode gas passage, a cathode gas passage, and a coolant passage) (not shown) through which the anode gas, the cathode gas, and the coolant flow along the stacking direction of the stack body 21. The anode gas passage communicates with the anode gas flow field 32, the cathode gas passage communicates with the cathode gas flow field 34, and the coolant passage communicates with the coolant flow field 36.

The fuel cell stack 12 is supplied with anode gas by the anode system apparatus 14. In the fuel cell stack 12, the anode gas flows through the anode gas passage (anode gas supply passage) into the anode gas flow field 32. The anode gas is used for power generation in the anode 28. Anode off-gas that has been used for power generation flows out from the anode gas flow field 32 to the anode gas passage (anode gas discharge passage) and is discharged from the fuel cell stack 12 to the anode system apparatus 14. The anode off-gas contains unreacted hydrogen.

Cathode gas is supplied to the fuel cell stack 12 by the cathode system apparatus 16. In the fuel cell stack 12, the cathode gas flows through the cathode gas passage (cathode gas supply passage) into the cathode gas flow field 34. The cathode gas is used for power generation in the cathode 30. The cathode off-gas that has been used for power generation flows out from the cathode gas flow field 34 to the cathode gas passage (cathode gas discharge passage) and is discharged from the fuel cell stack 12 to the cathode system apparatus 16.

Further, the fuel cell stack 12 is supplied with a coolant by the cooling apparatus 18. In the fuel cell stack 12, coolant flows through the coolant passage (coolant supply passage) into the coolant flow field 36. The coolant cools the power generation cell 20. The coolant that has cooled the power generation cells 20 flows out from the coolant flow field 36 to the coolant passage (coolant discharge passage) and is discharged from the fuel cell stack 12 to the cooling apparatus 18.

The anode system apparatus 14 of the fuel cell system 10 has an anode path 38. The anode path 38 includes an anode supply path 40 that supplies anode gas to the fuel cell stack 12 and an anode discharge path 42 that discharges anode off-gas from the fuel cell stack 12. The anode path 38 has an anode circulation path 44 for returning unreacted hydrogen contained in the anode off-gas of the anode discharge path 42 to the anode supply path 40.

The anode path 38 includes an anode supply path 40, an anode discharge path 42, and a circulation circuit 39, which are arranged downstream of the ejector 50. The circulation circuit 39 circulates the anode gas (anode off-gas) through the anode circulation path 44. A bleed path 46 is connected to the anode circulation path 44. The bleed path 46 supplies part of the anode off-gas from the circulation circuit 39 to the cathode system apparatus 16.

A tank 47 for storing anode gas is disposed upstream of the anode supply path 40. Further, an injector 48 and an ejector 50 are provided in the anode supply path 40 in order toward the downstream side in the flow direction of the anode gas. The injector 48 is opened and closed during the operation of the fuel cell system 10 to discharge the anode gas having a lower pressure than the internal pressure of the tank 47 to the downstream side. The ejector 50 supplies the anode gas discharged from the injector 48 to the fuel cell stack 12. Further, the ejector 50 suctions the anode off-gas from the anode circulation path 44 and supplies the suctioned anode off-gas to the fuel cell stack 12. The ejector 50 suctions the anode off-gas by a negative pressure generated by the flow of the anode gas discharged from the injector 48.

A gas-liquid separator 52 is provided in the anode discharge path 42. The gas-liquid separator 52 separates liquid water (water generated during power generation) contained in the anode off-gas from the anode off-gas. The anode circulation path 44 is connected to an upper portion of the gas-liquid separator 52. Thus, the anode off-gas (gas) from which the liquid water has been removed flows into the anode circulation path 44. One end of a drain path 54 for discharging the separated liquid water is connected to the bottom portion of the gas-liquid separator 52. A drain valve 56 for opening and closing the flow path is provided in the drain path 54. The bleed path 46 is provided with a bleed valve 58 that opens and closes a flow passage in the bleed path 46. The drain valve 56 and the bleed valve 58 are stop valves 55 for switching between opening (opening degree 100%) and closing (opening degree 0%). As the stop valve 55, for example, a solenoid valve is used.

The cathode system apparatus 16 of the fuel cell system 10 has a cathode path 60. The cathode path 60 includes a cathode supply path 62 that supplies cathode gas to the fuel cell stack 12, and a cathode discharge path 64 that discharges cathode off-gas from the fuel cell stack 12. A cathode bypass passage 66 is connected between the cathode supply path 62 and the cathode discharge path 64. As a result, the cathode gas in the cathode supply path 62 flows directly to the cathode discharge path 64 without passing through the fuel cell stack 12.

An air pump (air compressor) 68 that supplies cathode gas to the fuel cell stack 12 is provided in the cathode supply path 62. The air pump 68 rotates a fan (not shown), compresses air (outside air) on the upstream side of the air pump 68, and supplies the compressed air to the cathode supply path 62 on the downstream side. The air pump 68 may include a compressor in the cathode supply path 62 and an expander coaxial with the compressor in the cathode discharge path 64.

The cathode supply path 62 includes a temperature controller 70 (intercooler) between the air pump 68 and the cathode bypass passage 66. The temperature controller 70 cools the cathode gas with a coolant such as air, water, or the like. The cathode supply path 62 also includes a humidifier 72 between the cathode bypass passage 66 and the fuel cell stack 12. The above-described bleed path 46 is connected to the cathode supply path 62 downstream of the humidifier 72. Preferably, a gas-liquid separator (not shown) is provided at the connecting portion of the bleed path 46.

The humidifier 72 is provided so as to straddle the cathode supply path 62 and the cathode discharge path 64. The humidifier 72 humidifies the cathode gas supplied from the cathode supply path 62 by moisture (water generated during power generation or the like) contained in the cathode off-gas discharged from the fuel cell stack 12 to the cathode discharge path 64.

In the cathode discharge path 64, the drain path 54 of the anode system apparatus 14 is connected to the downstream side of the cathode bypass passage 66. If the air pump 68 includes an expander in the cathode discharge path 64, a gas-liquid separator is preferably provided between the humidifier 72 in the cathode discharge path 64 and the cathode bypass passage 66. The gas-liquid separator separates water contained in the cathode off-gas and discharges liquid water to the downstream side of the expander.

A bypass valve 74 is provided in the cathode bypass passage 66. The bypass valve adjusts the flow rate of the cathode gas bypassing the fuel cell stack 12. As the bypass valve 74, a butterfly valve whose opening degree can be linearly adjusted is used.

The fuel cell system 10 described above includes an ECU 80 (Electronic Control Unit: control device) for controlling each components of the fuel cell system 10. The ECU 80 is constituted by a computer having one or more processors, memories, input/output interfaces, and electronic circuits (none of which are shown). The ECU 80 controls the operation of the drain valve 56, the bleed valve 58, the air pump 68, the bypass valve 74, and the like by one or more processors executing a program (not shown) stored in the memory.

In the anode system apparatus 14, when the drain valve 56 is opened, liquid water separated in the gas-liquid separator 52 and anode gas contained in the anode off-gas are discharged to the drain path 54. The drain path 54 is connected to the cathode discharge path 64. Therefore, the anode gas in the drain path 54 is discharged to the outside together with the cathode gas through the cathode discharge path 64. In the anode system apparatus 14, when the bleed valve 58 is opened, nitrogen, oxygen, and anode gas contained in the anode off-gas flow out to the cathode supply path 62. After passing through the fuel cell stack 12, the anode gas is discharged to the cathode discharge path 64 and discharged to the outside together with the cathode off-gas.

In the fuel cell system 10 according to the present embodiment, a diluter for diluting the anode gas is not provided downstream of the connection point of the drain path 54 in the cathode discharge path 64. Thus, miniaturization of the fuel cell system 10 as a whole can be achieved.

When discharging the anode gas from the cathode discharge path 64 to the outside of the moving body 11, the ECU 80 appropriately adjusts the supply amount of the cathode gas in accordance with the situation of the moving body 11. Thus, the anode gas that has flowed into the cathode discharge path 64 is favorably diluted. A description will now be given of a method of supplying the cathode gas in each of the cases where the moving body 11 is traveling and where the moving body 11 is stopped.

[During Traveling of Moving Body 11]

The fuel cell system 10 generates power in the fuel cell stack 12 while the moving body 11 is traveling (during operation by an ignition or a starter switch being turned on). This power generation is based on a power generation request from the travel control ECU or the battery ECU. At this time, the ECU 80 supplies electric power corresponding to the power generation request, to the air pump 68. In addition, the amount of the cathode gas supplied to the fuel cell stack 12 is adjusted by adjusting the opening degree of the bypass valve 74.

Figure 2:
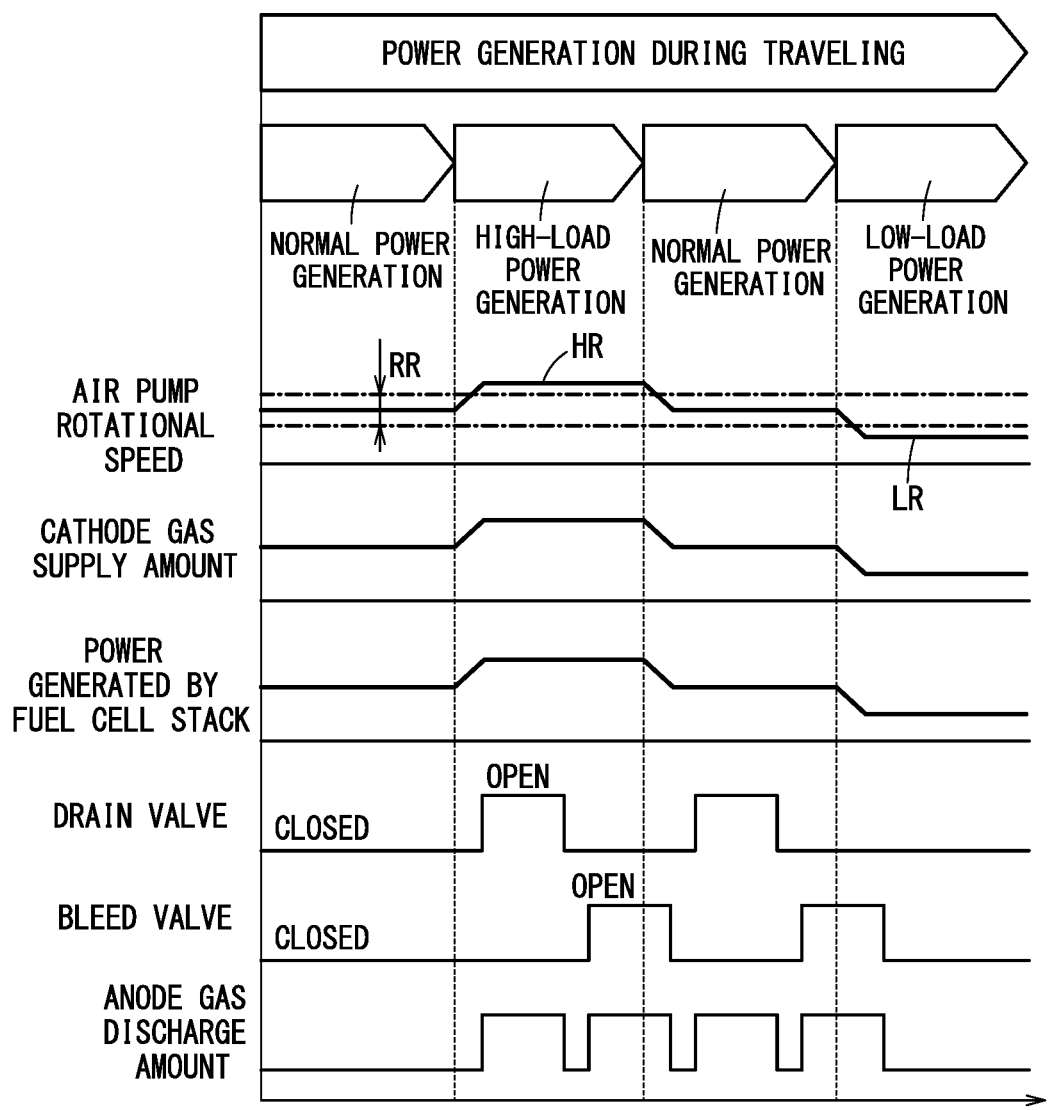
FIG. 2 is a timing chart for explaining power generation in the fuel cell system while the moving body is traveling.

As shown in FIG. 2, the fuel cell system 10 performs normal power generation in a situation where the moving body 11 is traveling on a flat road or the like. The normal power generation generates power in accordance with the power consumption of the traction motor Mt and the air pump 68 necessary for normal traveling. At this time, the ECU 80 changes the rotational speed of the air pump 68 within a predetermined rotational range RR, based on the power generation request (the rotational speed is set to be constant for convenience in FIG. 2). Accordingly, an appropriate amount of cathode gas is supplied from the air pump 68 to the fuel cell stack 12.

Further, in a situation where a high load is applied to the traction motor Mt, for example, when the moving body 11 is climbing a hill road, the fuel cell system 10 performs a high-load power generation. At this time, the ECU 80 rotates the air pump 68 at a high-load rotational speed HR higher than the rotational range RR for the normal traveling or at a rotational speed near the upper limit of the rotational range RR. Therefore, the supply amount of the cathode gas supplied to the fuel cell stack 12 (flow rate corresponding to the high-load rotational speed HR) is larger than the supply amount of the normal power generation.

Conversely, in a situation in which the traction motor Mt is subjected to a low load, such as when the user of the moving body 11 loosens the accelerator, the fuel cell system 10 performs a low-load power generation. At this time, the ECU 80 rotates the air pump 68 at a low-load rotational speed LR which is lower than the rotational range RR for the normal traveling or at a rotational speed close to the lower limit of the rotational range RR. Therefore, the supply amount (flow rate corresponding to the low-load rotational speed LR) of the cathode gas supplied to the fuel cell stack 12 is smaller than the supply amount of the normal power generation.

A small amount of cathode gas is supplied to the fuel cell stack 12 even when the power generation request is zero in a situation where the moving body 11 is traveling or stopped. In this case, the fuel cell system 10 rotates the air pump 68 at a low rotational speed, for example, at a rotational speed close to the low-load rotational speed LR. Thus, the fuel cell stack 12 performs idle power generation in which the generated power is lower than the power consumption of the air pump 68. Power generated by the idle power generation is consumed by the air pump 68.

While the moving body 11 is traveling, the ECU 80 also controls the auxiliary devices (such as the injector 48) of the anode system apparatus 14 to supply the anode gas in a supply amount corresponding to the supply amount of the cathode gas, to the fuel cell stack 12. Thus, the fuel cell stack 12 outputs electric power corresponding to various types of power generation (normal power generation, high-load power generation, low-load power generation, idle power generation, etc.).

During the traveling of the moving body 11, an anode gas (anode off-gas) corresponding to the power generation of the fuel cell stack 12 circulates in the circulation circuit 39 of the anode path 38. The fuel cell system 10 appropriately opens the drain valve 56 and the bleed valve 58 to discharge the generated water, nitrogen, oxygen and the like flowing through the circulation circuit 39, to the cathode discharge path 64. The generated water, nitrogen, oxygen and the like flowing through the circulation circuit 39 are cathode gas that has passed through the electrolyte membrane 26. In FIG. 2, the drain valve 56 and the bleed valve 58 are opened at different timings. However, for example, the drain valve 56 and the bleed valve 58 may be simultaneously opened during the execution of the high-load power generation.

Figure 3A:
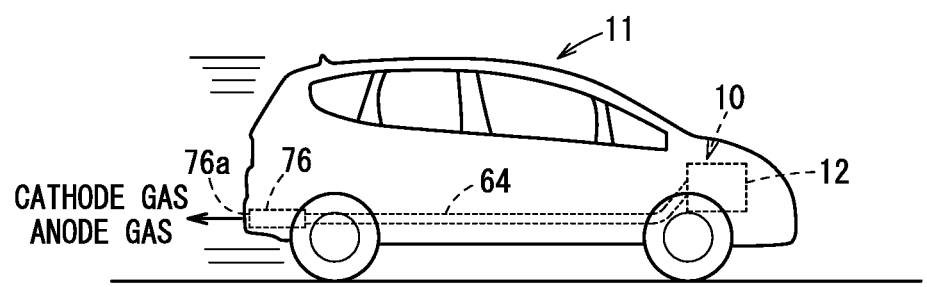
FIG. 3A is a schematic side view showing discharge of anode gas and cathode gas while the moving body is traveling.

When the drain valve 56 or the bleed valve 58 is opened, the anode gas also flows out. Here, as shown in FIG. 3A, when the moving body 11 is traveling, there is no element (such as an ignition source) that causes anode gas to catch fire, near a discharge port 76a of a tail pipe 76 through which the cathode discharge path 64 communicates. Therefore, the cathode gas supplied along with the power generation of the fuel cell stack 12 dilutes the anode gas, thereby ensuring safety in discharging the anode gas.

Figure 4:
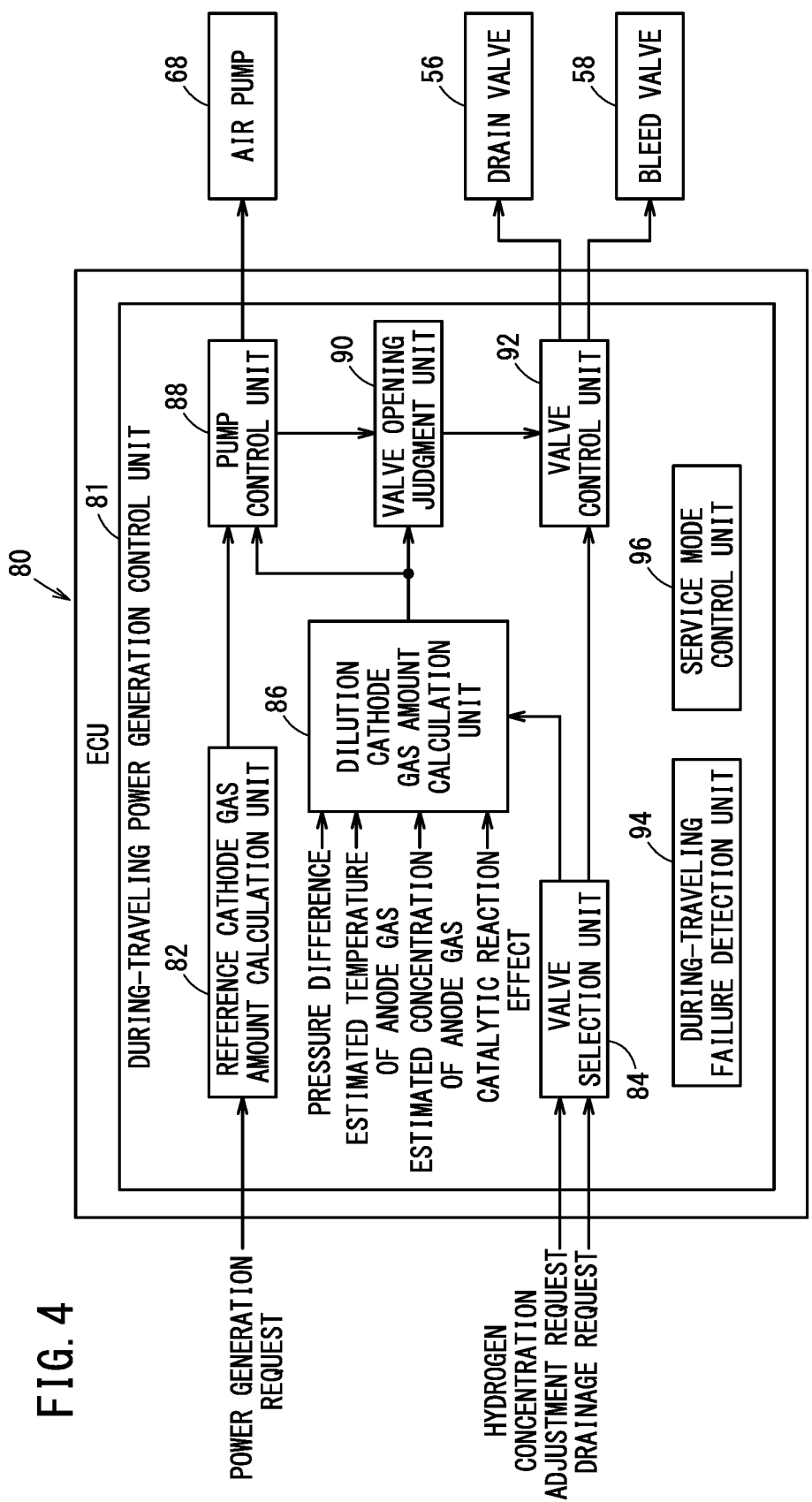
FIG. 4 is a block diagram showing a functional block for performing processing by a power generation control unit of an ECU while the moving body is traveling.

Even if the air pump 68 is rotated at the low-load rotational speed LR by performing the low-load power generation or the idle power generation while the moving body 11 is traveling, a small supply amount of the cathode gas can sufficiently dilute the anode gas. For example, it is possible to adjust the concentration of the anode gas such that the average of the volume concentration of the anode gas calculated based on concentration data obtained every three seconds will not exceed the value of 4%, or such that the instantaneous maximum value of the concentration of the anode gas at a given time will not exceed 8%. As shown in FIG. 4, for example, the ECU 80 includes a during-traveling power generation control unit 81. The during-traveling power generation control unit 81 controls the dilution of the anode gas by supplying the cathode gas while the moving body 11 is traveling.

The during-traveling power generation control unit 81 includes a reference cathode gas amount calculation unit 82, a valve selection unit 84, a dilution cathode gas amount calculation unit 86, a pump control unit 88, a valve opening judgment unit 90, a valve control unit 92, a during-traveling failure detection unit 94, and a service mode control unit 96.

The reference cathode gas amount calculation unit 82 calculates a target supply amount of the cathode gas to be supplied to the fuel cell stack 12. The calculation of the target supply amount is based on a power generation request signal transmitted from another ECU, for example, a travel control ECU for controlling the traction motor Mt, a battery ECU for monitoring the battery level of the battery Bt, or the like. The ECU 80 may have a function of the travel control ECU or the battery ECU. The ECU 80 may also calculate a power generation request based on signals from sensors such as an accelerator opening sensor and a wheel speed sensor.

The valve selection unit 84 selects a valve to be opened, from among the drain valve 56 and the bleed valve 58. The selection of the valve is based on a hydrogen concentration adjustment request of an ECU (not shown) that monitors the hydrogen concentration, or a drainage request of an ECU (not shown) that monitors the amount of accumulated water of the gas-liquid separator 52 (or other gas-liquid separator), or a detection signal of a sensor that detects the amount of accumulated water of the gas-liquid separator 52 (or other gas-liquid separator).

The dilution cathode gas amount calculation unit 86 calculates an amount of cathode gas (dilution cathode gas amount) necessary for dilution of the anode gas. The calculation of the dilution cathode gas amount is based on the valve opening request of the drain valve 56 or the bleed valve 58 selected by the valve selection unit 84. For example, the dilution cathode gas amount calculation unit 86 calculates the discharge amount of the anode gas. The calculation of the discharge amount is based on the pressure difference between the upstream and the downstream of the bleed path 46 or the drain path 54, the estimated temperature of the anode gas, the estimated concentration of the anode gas, the catalytic reaction effect, and the like. The pressure difference between upstream and the downstream of the bleed path 46 or the drain path 54 is obtained from an ECU or a sensor (not shown). Further, the dilution cathode gas amount calculation unit 86 calculates the dilution cathode gas amount based on the calculated anode gas discharge amount.

The pump control unit 88 calculates the rotational speed of the air pump 68. The calculation of the rotational speed is based on the target supply amount calculated by the reference cathode gas amount calculation unit 82 and the dilution cathode gas amount calculated by the dilution cathode gas amount calculation unit 86. The pump control unit 88 controls the rotation of the air pump 68 based on the calculated rotational speed. There are cases in which the rotational speed of the air pump 68 may become greater than a value necessary for power generation of the fuel cell stack 12, by setting the rotational speed to a value at which the anode gas can be diluted. In this case, the ECU 80 changes the opening degree of the bypass valve 74 to adjust the amount of cathode gas flowing through the cathode bypass passage 66. Thus, the amount of the cathode gas supplied to the fuel cell stack 12 is adjusted to an appropriate amount corresponding to a power-generation electric power.

The valve opening judgment unit 90 permits opening of the valve. The valve opening permission is based on the timing at which the actual flow rate detected by a flow rate sensor (not shown) of the cathode gas provided in the cathode supply path 62 exceeds the dilution cathode gas amount calculated by the dilution cathode gas amount calculation unit 86.

The valve control unit 92 opens the selected stop valve 55 (one of the drain valve 56 and the bleed valve 58). The opening of the stop valve 55 is based on selection information of the drain valve 56 and the bleed valve 58 selected by the valve selection unit 84, and valve opening permission by the valve opening judgment unit 90. In addition, the valve control unit 92 may open both the drain valve 56 and the bleed valve 58 during the high-load power generation.

Thus, the ECU 80 discharges the anode gas from the circulation circuit 39 in accordance with the rotational speed of the air pump 68. The discharge of the anode gas is performed by opening one of the drain valve 56 and the bleed valve 58, or by opening both the drain valve 56 and the bleed valve 58. Both the drain valve 56 and the bleed valve 58 are opened during the high-load power generation. For example, even in the case of performing the low-load power generation in which the air pump 68 is rotated at the low-load rotational speed LR or the idle power generation, an amount of the cathode gas capable of diluting the anode gas is supplied to the cathode discharge path 64. Accordingly, the fuel cell system 10 can safely discharge the anode gas and the cathode gas while the moving body 11 is traveling.

While the moving body 11 is traveling, the during-traveling failure detection unit 94 detects a failure of each stop valve 55 (drain valve 56, bleed valve 58) of the fuel cell system 10 and a leakage of the anode gas. For example, the during-traveling failure detection unit 94 monitors an opening/closing command of the drain valve 56 and a voltage of the drain valve 56. Then, when a voltage is being applied to the drain valve 56 despite the valve closing command of the drain valve 56, it is determined that the drain valve 56 is opened by mistake. According to this detection method (hereinafter referred to as a command operation mismatch detection method), the during-traveling failure detection unit 94 can detect an open failure in which the drain valve 56 is kept open without being closed and a leakage of the anode gas. The same applies to the bleed valve 58. This detection method has the advantage that the abnormality of each stop valve 55 can be detected in a short time. Alternatively, in a state of giving a command for closing the valve to the drain valve 56, the during-traveling failure detection unit 94 calculates the amount of hydrogen leakage from the detected pressure of the pressure sensor (not shown in the circulation circuit 39) and the value of the power generation electric current. When the leakage amount is large, it can be determined that the drain valve 56 is opened by mistake. Also in this detection method (hereinafter referred to as a pressure drop detection method), the during-traveling failure detection unit 94 can detect an open failure in which the drain valve 56 fails to close and a leakage of anode gas. The same applies to the bleed valve 58. Although the pressure drop detection method requires a longer time than the command operation mismatch detection method, the detection accuracy can be improved.

The service mode control unit 96 performs the operation of the fuel cell system 10 when an operation by a service person is performed during inspection operation, maintenance operation, or the like. For example, the service mode control unit 96 operates after the abnormality of the drain valve 56 or the bleed valve 58 has been detected. Then, the rotational speed of the air pump 68 is set to a rotational speed (service mode rotational speed) which is greater than the low-load rotational speed LR. At this time, the service mode control unit 96 adjusts the supply amount of the cathode gas to the fuel cell stack 12 in accordance with the opening degree of the bypass valve 74, thereby performing the normal power generation or low-load power generation. As a result, in the service mode, it is possible to take measures such as recheck of a failure location, initialization of each auxiliary device (stop valve 55 or the like) in which a failure has occurred, reset of each ECU, start and stop, or the like.

The service mode control unit 96 may output a valve closing command to the drain valve 56 or the bleed valve 58 after the abnormality of the drain valve 56 or the bleed valve 58 has been detected, thereby preventing the discharge of the anode gas. For example, even if the drain valve 56 is in an open failure state in which the valve cannot be closed, the discharge amount of the anode gas discharged to the cathode discharge path 64 can be suppressed by closing the bleed valve 58 by the valve closing command.

[During Stoppage of Traveling of Moving Body 11]

Next, a method of supplying the cathode gas during power generation while the moving body 11 is stopped will be described. The fuel cell system 10 determines a state in which power generation should be performed even when traveling of the moving body 11 is stopped (during non-operation by an ignition or a starter switch being turned off), and automatically performs power generation of the fuel cell stack 12. Situations in which power generation should be performed include avoidance of freezing of the fuel cell system 10, remote activation of the air conditioning system, external power supply, charging of the battery Bt, and the like. Even during the stop of traveling, the ECU 80 adjusts the supply amount of the cathode gas to the fuel cell stack 12 by adjusting the operation of the air pump 68 and the opening degree of the bypass valve 74.

Here, the discharge amount of the anode gas discharged from the anode path 38 is determined in accordance with the flow path cross-sectional area of the drain valve 56 or the flow path cross-sectional area of the bleed valve 58. Therefore, the fuel cell system 10 opens either the drain valve 56 or the bleed valve 58 to discharge the anode gas even in the power generation during the stoppage of traveling. At this time, if the air pump 68 supplies the cathode gas at the same rotational speed as when the vehicle is traveling, the anode gas can be sufficiently diluted.

Figure 3B:
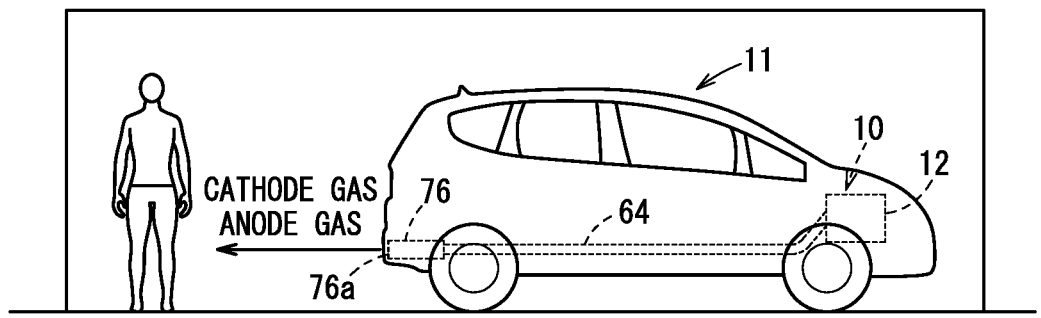
FIG. 3B is a schematic side view showing the discharge of the anode gas and the cathode gas while the moving body is stopped.

However, when an open failure occurs in which the drain valve 56 does not close or an open failure occurs in which the bleed valve 58 does not close, the anode gas is not sufficiently diluted. For example, if the bleed valve 58 is opened in the event of an open failure of the drain valve 56, anode gas will be discharged from both the drain path 54 and the bleed path 46. Therefore, the discharge amount of the anode gas increases as a whole of the anode system apparatus 14 (see also FIG. 6B). As shown in FIG. 3B, when the moving body 11 is not traveling, there is a possibility that there exists a factor causing anode gas to catch fire, in the vicinity of the discharge port 76a of the tail pipe 76. The cause of catching fire is, for example, the existence of a kind of ignition source whose temperature is higher than the hydrogen ignition point temperature, such as the work of throwing sparks in a garage.

Figure 5:
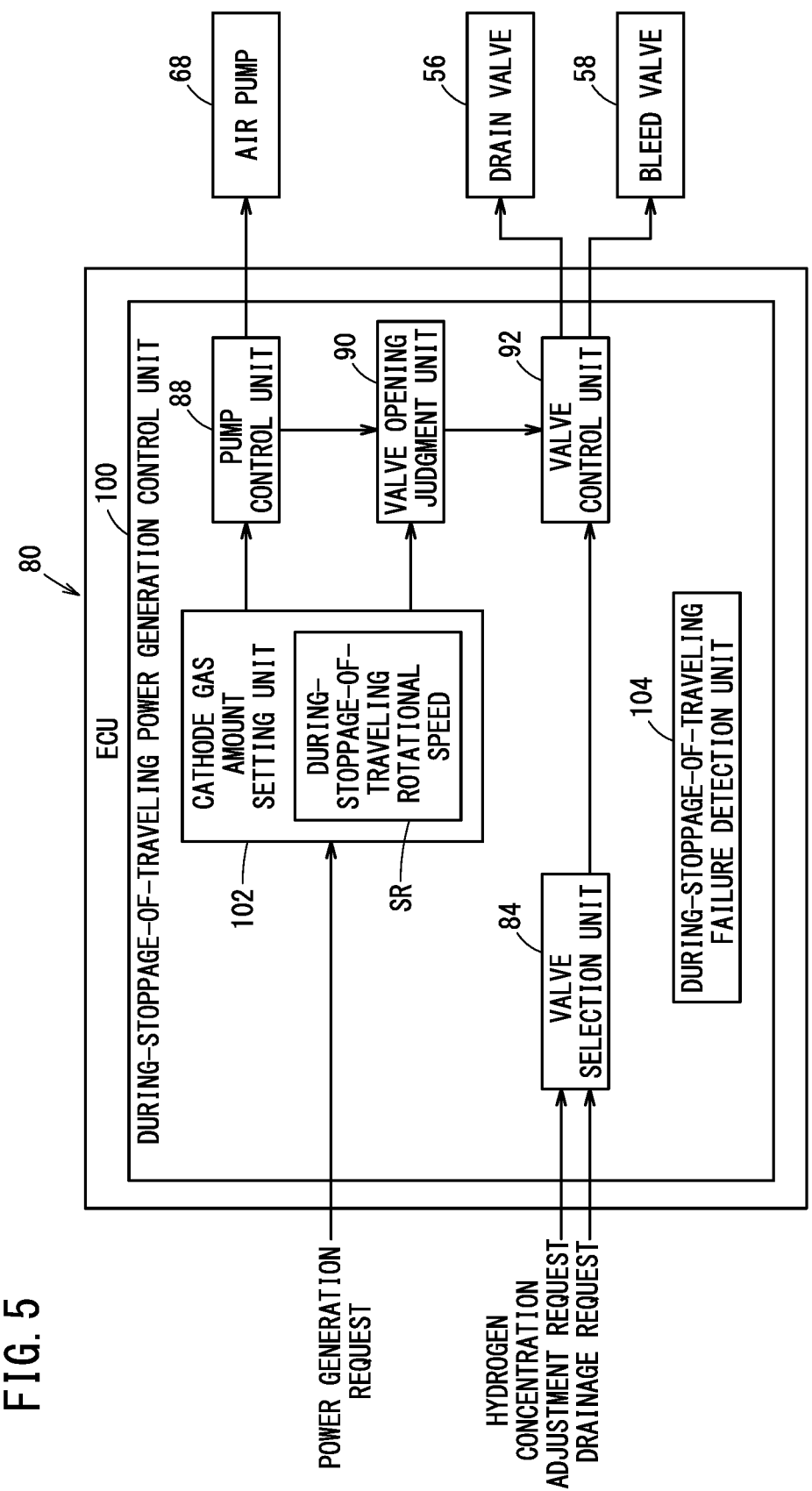
FIG. 5 is a block diagram showing a functional block for performing processing by the power generation control unit of the ECU while the moving body is stopped.

Therefore, during the stoppage of traveling of the moving body 11, the ECU 80 has a during-stoppage-of-traveling power generation control unit 100 as shown in FIG. 5. The during-stoppage-of-traveling power generation control unit 100 performs control to dilute the anode gas. The control for diluting the anode gas supplies a larger amount of cathode gas than an amount of cathode gas supplied in the low-load power generation or the idle power generation.

Specifically, the during-stoppage-of-traveling power generation control unit 100 has a valve selection unit 84, a pump control unit 88, a valve opening judgment unit 90, and a valve control unit 92, as in the case of the during-traveling power generation control unit 81. Further, the during-stoppage-of-traveling power generation control unit 100 has a cathode gas amount setting unit 102 in place of the reference cathode gas amount calculation unit 82 and the dilution cathode gas amount calculation unit 86. Further, the during-stoppage-of-traveling power generation control unit 100 has a during-stoppage-of-traveling failure detection unit 104 in place of the during-traveling failure detection unit 94.

The cathode gas amount setting unit 102 stores a predetermined value of the rotational speed of the air pump 68 used in the power generation during the stoppage of traveling (hereinafter referred to as a during-stoppage-of-traveling rotational speed (a travel-stopping rotational speed) SR). The during-stoppage-of-traveling rotational speed SR is the rotational speed of the air pump 68 corresponding to the dilution of the total amount of the anode gas when the anode gas is discharged from the plurality of stop valves 55 (the drain valve 56 and the bleed valve 58). That is, the during-stoppage-of-traveling rotational speed SR is calculated as follows. First, the total amount of the discharged anode gas is calculated based on the cross-sectional areas of the flow paths of the plurality of stop valves 55. Next, the rotational speed at which the cathode gas can be surely supplied at such an amount as to sufficiently dilute the total amount of the anode gas is determined in advance by the manufacturer through experiments or the like. When there are three or more stop valves 55 for discharging the anode gas from the anode path 38, the during-stoppage-of-traveling rotational speed SR may correspond to dilution of the discharge amounts of the anode gas of two stop valves 55 or may correspond to dilution of the discharge amounts of the anode gas of the three or more stop valves 55.

Figure 6A:
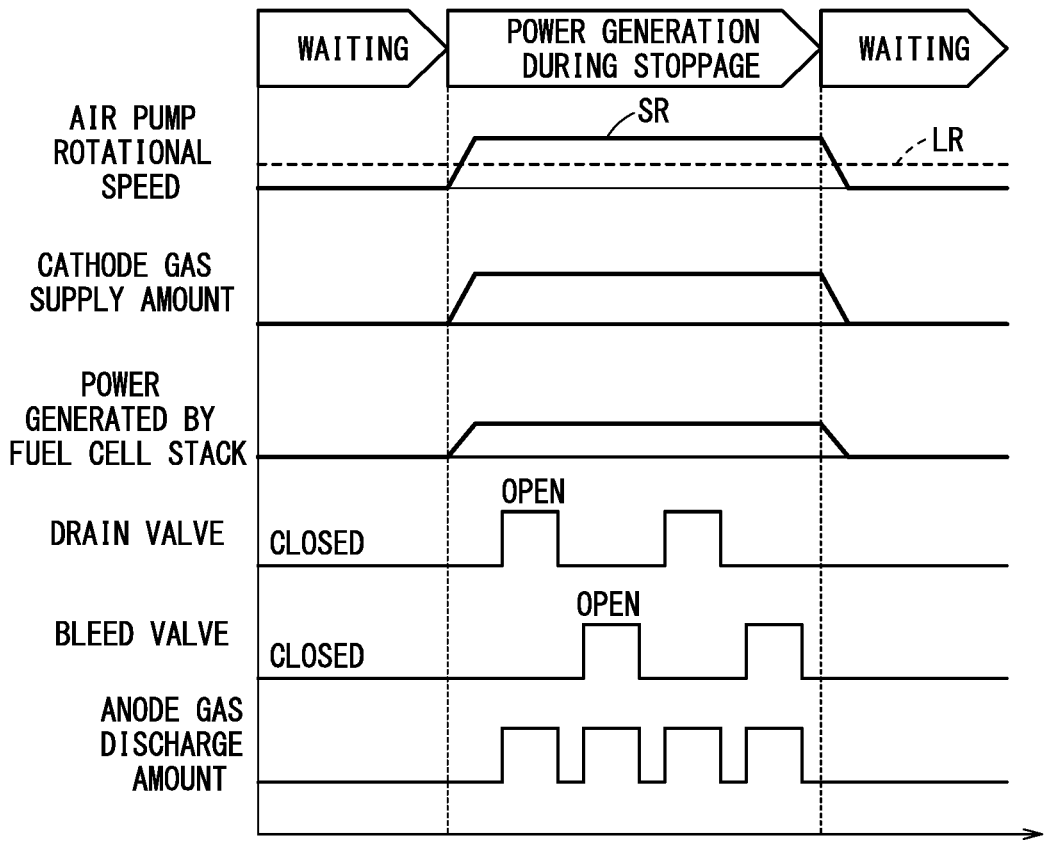
FIG. 6A is a timing chart for explaining the power generation of the fuel cell system while the moving body is stopped.
Figure 6B:
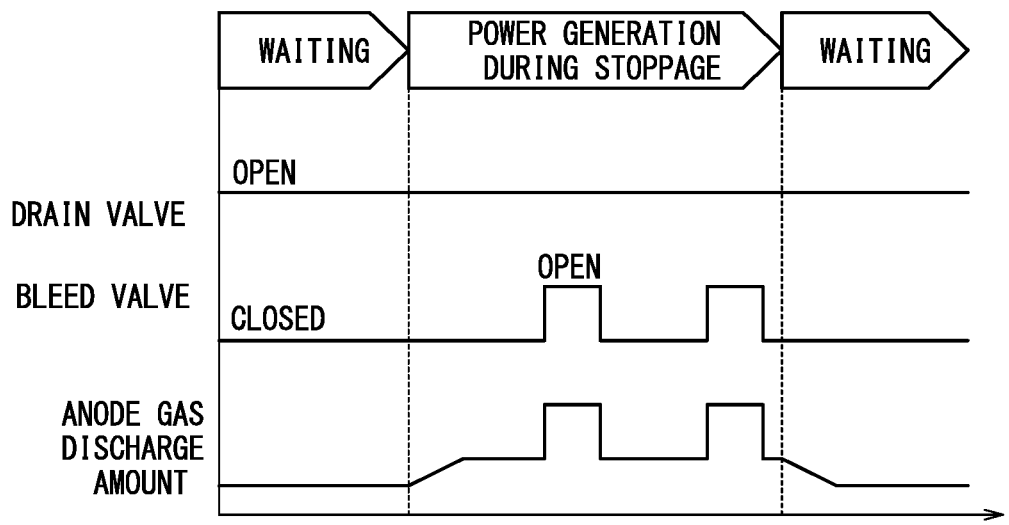
FIG. 6B is a timing chart illustrating the amount of discharge of the anode gas when a drain valve is in an open failure.

Specifically, as shown in FIG. 6A, the during-stoppage-of-traveling rotational speed SR is greater than the low-load rotational speed LR. The low-load rotational speed LR is the rotational speed of the air pump 68 used when performing the low-load power generation or the idle power generation while the moving body 11 is traveling. It should be noted that the during-stoppage-of-traveling rotational speed SR may be lower than the high-load rotational speed HR. The high-load rotational speed HR is the rotational speed of the air pump 68 used when the high-load power generation is performed while the moving body 11 is traveling. As a result, power consumption due to excessive supply of cathode gas in the fuel cell system 10 can be suppressed during the stoppage of traveling.

Upon receiving a power generation request transmitted from another ECU during the stoppage of traveling, the cathode gas amount setting unit 102 automatically sets the during-stoppage-of-traveling rotational speed SR stored by itself and outputs it to the pump control unit 88. The pump control unit 88 controls the rotation of the air pump 68 on the basis of the during-stoppage-of-traveling rotational speed SR set by the cathode gas amount setting unit 102. The operations of the valve selection unit 84, the valve opening judgment unit 90, and the valve control unit 92 are the same as those of the during-traveling power generation control unit 81. That is, the valve selection unit 84 selects one of the drain valve 56 and the bleed valve 58. The valve control unit 92 opens the selected valve based on the permission of opening given by the valve opening judgment unit 90.

As a result, the fuel cell system 10, while discharging anode gas from the circulation circuit 39, rotates the air pump 68 in accordance with the during-stoppage-of-traveling rotational speed SR to supply cathode gas to the fuel cell stack 12. The supply amount of the anode gas supplied from the anode system apparatus 14 to the fuel cell stack 12 during the stoppage of traveling is set to, for example, the same supply amount as that at the time of the low-load power generation during traveling. Therefore, the fuel cell stack 12 performs the low-load power generation based on the inflow of the anode gas and the cathode gas, and outputs the generated power. The cathode gas supplied in excess of the necessary amount for power generation by the fuel cell stack 12 is guided from the cathode bypass passage 66 to the cathode discharge path 64 in accordance with the opening degree of the bypass valve 74.

Accordingly, the cathode gas supplied from the rotating air pump 68 dilutes the anode gas. Even if one or both of the drain valve 56 and the bleed valve 58 is subjected to an open failure and anode gas consequently flows out from both the bleed path 46 and the drain path 54, the anode gas discharged from the two stop valves 55 can be diluted. Therefore, the fuel cell system 10 can sufficiently dilute the anode gas in the power generation during the stoppage of traveling. For example, it is possible to adjust the concentration of the anode gas such that the average of the volume concentration of the anode gas calculated based on concentration data obtained every three seconds will not exceed the value of 4%, or such that the instantaneous maximum value of the concentration of the anode gas at a given time will not exceed 8%.

The during-stoppage-of-traveling failure detection unit 104 detects a failure of each valve (the drain valve 56 and the bleed valve 58) of the fuel cell system 10 and a leakage of the anode gas while the moving body 11 is stopped. For example, during the stoppage of traveling of the moving body, the failure detection unit 104 acquires a detected pressure of a pressure sensor (not shown) of the circulation circuit 39, and constantly calculates an outflow amount of anode gas for each of the drain valve 56 and the bleed valve 58. The during-stoppage-of-traveling failure detection unit 104 commands the drain valve 56 or the bleed valve 58 to open and close in order. When the outflow amount of the anode gas is large in spite of the valve closing command, it can be determined that the drain valve 56 or the bleed valve 58 is erroneously opened. According to this detection method (hereinafter referred to as an outflow amount estimation detection method), the during-stoppage-of-traveling failure detection unit 104 can detect an open failure of the valve and a leakage of the anode gas. Further, although the outflow estimation detection method takes longer time than the command operation mismatch detection method or the pressure drop detection method described above, the outflow estimation detection method can perform highly accurate detection. Further, since no voltage sensor or current sensor is provided, the cost can be reduced.

The fuel cell system 10 according to the present embodiment is basically configured as described above. The processing flow will be described below with reference to FIG. 7.

When performing power generation in the fuel cell stack 12, the ECU 80 of the fuel cell system 10 first determines whether the moving body 11 is traveling or stopped, based on a signal of the ignition or the starter switch (step S1). If it is determined that the moving body 11 is traveling (step S1: YES), the process proceeds to step S2 where a cathode-gas supply process by the during-traveling power generation control unit 81 is performed.

Specifically, the during-traveling power generation control unit 81 first determines whether to execute the service mode for maintenance of the fuel cell system 10 (step S2). As described above, the service mode is executed when an operation is performed by a serviceperson (car technician) or the like, and is not executed in other cases. If the service mode is not executed in step S2 (step S2: YES), the during-traveling power generation control unit 81 executes power generation of the fuel cell stack 12 based on the power generation request (step S3).

In power generation control during traveling, the ECU 80 appropriately performs the normal power generation, the high-load power generation, the low-load power generation, the idle power generation, or the like, and adjusts the rotational speed of the air pump 68 according to the type of power generation. Thus, an amount of the cathode gas corresponding to the rotational speed of the air pump 68 flows through the cathode path 60, and the anode gas discharged from the anode system apparatus 14 is diluted. For example, the anode gas flowing out to the drain path 54 by opening the drain valve 56 flows into the cathode discharge path 64, and is diluted by the cathode gas. Then, it is discharged to the outside of the moving body 11 together with the cathode gas. Similarly, the anode gas flowing out to the bleed path 46 due to the opening of the bleed valve 58 flows into the cathode supply path 62 and is mixed with the cathode gas. Then, the anode gas flows through the fuel cell stack 12, is discharged into the cathode discharge path 64, and is discharged to the outside of the moving body 11 together with the cathode gas.

The during-traveling failure detection unit 94 determines whether or not the drain valve 56 or the bleed valve 58 has failed during power generation of the fuel cell stack 12 (step S4). At this time, the during-traveling failure detection unit 94 detects failures of the drain valve 56 and the bleed valve 58 by the above-described command operation mismatch detection method without spending a long time. Thus, it is possible to quickly check that the drain valve 56 or the bleed valve 58 has failed.

If it is determined that the drain valve 56 or the bleed valve 58 has failed (step S4: YES), the during-traveling failure detection unit 94 proceeds to step S5, and stores a failure code of the failed valve. In case of the open failure of the drain valve 56 or the bleed valve 58, the during-traveling failure detection unit 94 stops the supply of the anode gas to the anode system apparatus 14. In addition, a valve closing command is issued to the drain valve 56 and the bleed valve 58 (step S6). Further, the during-traveling failure detection unit 94 notifies the user of the moving body 11 that an abnormality has occurred in the anode system apparatus 14 via a notification unit (not shown) of the moving body 11 (step S7).

When the drain valve 56 or the bleed valve 58 has not failed in step S4 and after the end of step S7, the ECU 80 determines whether or not the traveling of the moving body 11 has ended (step S8). When the traveling of the moving body 11 is continued (step S8: NO), the process returns to step S3, and the same processing flow is repeated.

If it is determined in step S1 that the moving body 11 is in the stoppage of traveling (step S1: NO), the process proceeds to step S9, and the during-stoppage-of-traveling power generation control unit 100 performs a cathode-gas supply process.

In step S9, the during-stoppage-of-traveling power generation control unit 100 rotates the air pump 68 based on the during-stoppage-of-traveling rotational speed SR set by the cathode gas amount setting unit 102. Then, the cathode gas is supplied at a supply amount larger than the supply amount of the cathode gas for the low-load power generation during traveling. The supply amount of the cathode gas depends on the sum of the discharge amount of the anode gas from the drain valve 56 and the discharge amount of the anode gas from the bleed valve 58. Thus, even if the anode gas is discharged from a plurality of discharge paths (the bleed path 46, the drain path 54) due to an open failure in which the drain valve 56 or the bleed valve 58 does not close, the anode gas can be sufficiently diluted by the cathode gas.

The during-stoppage-of-traveling failure detection unit 104 determines whether the drain valve 56 or the bleed valve 58 has failed during power generation of the fuel cell stack 12 (step S10). At this time, the during-stoppage-of-traveling failure detection unit 104 detects the failure of the drain valve 56 and the bleed valve 58 over time longer than the outflow amount estimation detection method described above. Thus, the failure of the drain valve 56 or the bleed valve 58 can be detected with high accuracy. Even if a long time is required for failure detection, ignition of anode gas or the like can be avoided because the anode gas continues to be diluted by the cathode gas having a large supply amount.

If it is determined in step S10 that the valve has failed (step S10: YES), the during-stoppage-of-traveling failure detection unit 104 proceeds to step S11, and stores a failure code of the valve that has failed. Further, the during-stoppage-of-traveling failure detection unit 104 notifies the user of the moving body 11 that an abnormality has occurred in the anode system apparatus 14 via a notification unit (not shown) of the moving body 11 (step S12).

When the drain valve 56 or the bleed valve 58 has not failed in step S10 (step S10: NO) or after the end of step S12, the ECU 80 determines whether or not power generation during the stoppage of traveling of the moving body 11 ends (step S13). When the power generation of the fuel cell stack 12 is continued while the moving body 11 is stopped (step S13: NO), the ECU 80 returns to step S9 and repeats the same processing flow.

Figure 8:
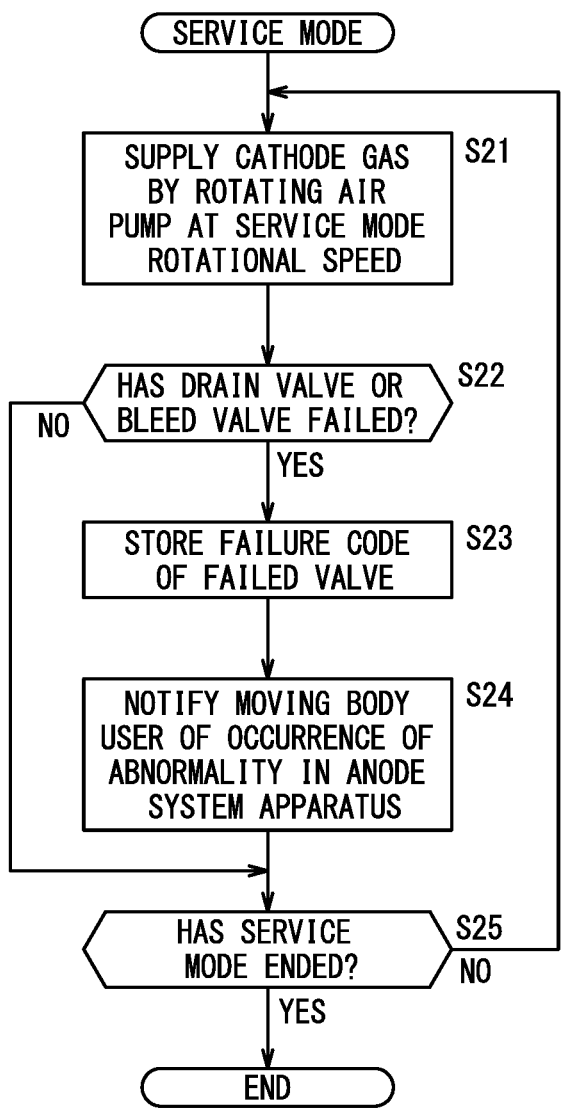
FIG. 8 is a flowchart illustrating a process flow in a service mode.

On the other hand, when it is determined that the service mode should be executed in step S2 shown in FIG. 7 (step S2: NO), the service mode control unit 96 starts the control of the fuel cell system 10 as shown in FIG. 8. The service mode control unit 96 may prohibit the traveling of the moving body 11 during the service mode.

In the service mode, the service mode control unit 96 sets a service mode rotational speed greater than the low-load rotational speed LR of the air pump 68 for the low-load power generation. Thus, the increased supply amount of the cathode gas is supplied downstream of the air pump 68 (step S21). The during-traveling failure detection unit 94 determines whether the drain valve 56 or the bleed valve 58 has failed even in the service mode (step S22). In the service mode, the supply amount of the cathode gas is large and the anode gas is diluted. Therefore, the during-traveling failure detection unit 94 takes a time and detects a failure of the drain valve 56 and the bleed valve 58, by using the outflow amount estimation detection method (or the pressure drop detection method) described above, for example.

If it is determined in step S22 that a failure has occurred (step S22: YES), the during-traveling failure detection unit 94 proceeds to step S23 and stores a failure code for the valve that has failed. Further, the during-traveling failure detection unit 94 notifies the user of the moving body 11 that an abnormality has occurred in the anode system apparatus 14 via a notification unit (not shown) of the moving body 11 (step S24).

If it is determined in step S22 that the drain valve 56 and the bleed valve 58 have not failed (step S22: NO) and after the end of step S24, the ECU 80 determines whether to end the service mode (step S25).

If the service mode is continued (step S25: NO), the service mode control unit 96 returns to step S21 and repeats the same processing flow. By implementing the service mode in this manner, the fuel cell system 10 can check the failure of the stop valve 55 and quickly take necessary measures when the moving body 11 is traveling. It should be noted that the moving body 11 may be allowed to travel in the service mode, whereby the moving body can be easily transported to a maintenance factory or the like.

The present invention is not limited to the embodiments described above, and various modifications can be made in accordance with the essence and gist of the invention. For example, the air pump 68 is not limited to a compressor, and a device capable of supplying an oxygen-containing gas such as a blower may be used.

For example, in the processing flow described above, the ECU 80 outputs a valve closing command to the stop valve 55 when a failure of the stop valve 55 (the drain valve 56, the bleed valve 58) is detected while the moving body 11 is traveling (step S6 in FIG. 7). Alternatively, when detecting a failure of the stop valve 55 while the moving body 11 is traveling, the ECU 80 may perform control to increase the rotational speed of the air pump 68 to a value greater than the rotational speed of the air pump 68 in a state in which the stop valve 55 is not in failure. As a result, a sufficient supply amount of cathode gas can be led to the cathode discharge path 64 to dilute the anode gas.

Figure 9:
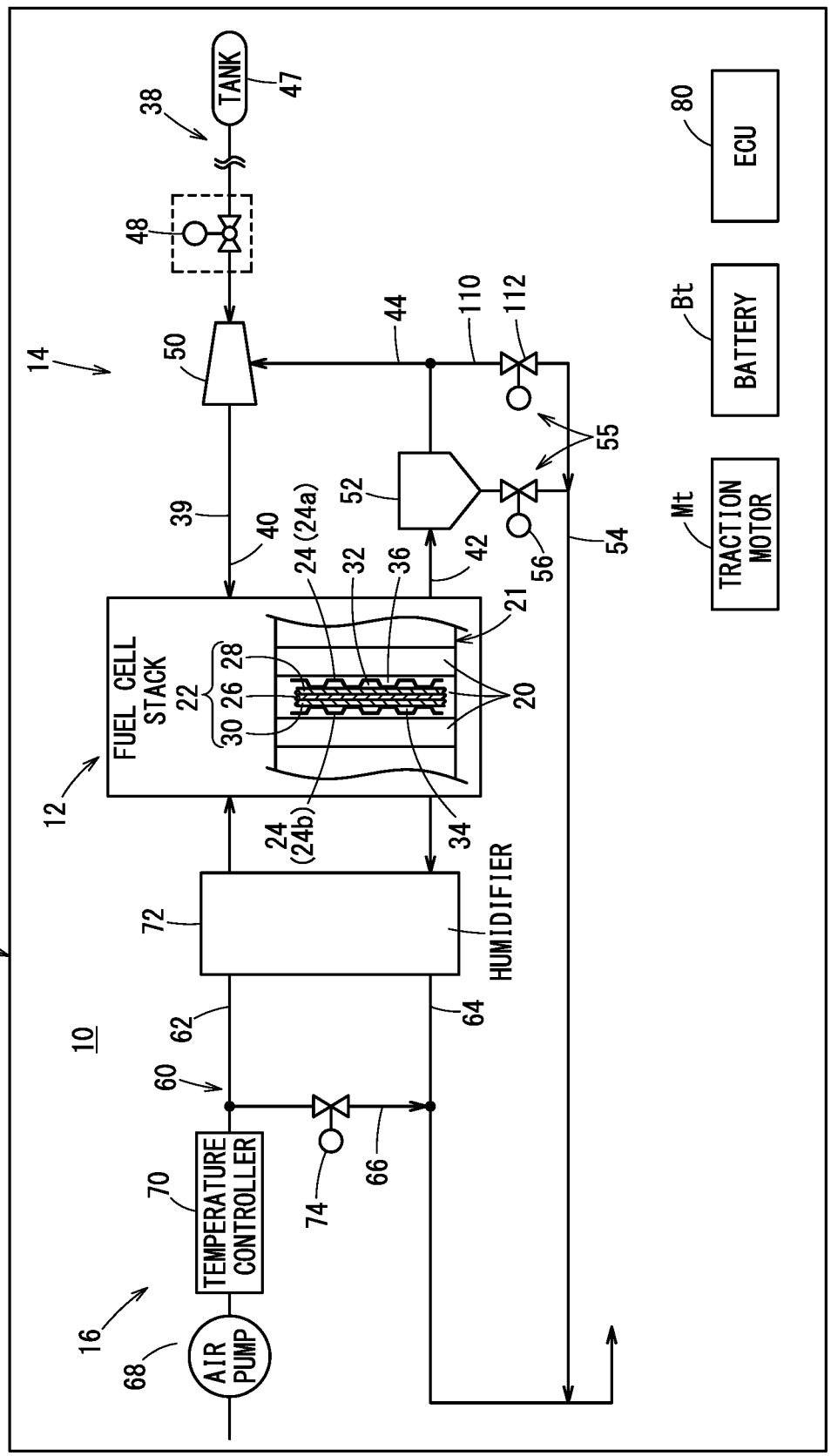
FIG. 9 is an explanatory view showing the overall configuration of the fuel cell system according to a modification.

For example, as shown in FIG. 9, in the fuel cell system 10, a purge path 110 is connected to the anode circulation path 44. Further, a purge valve 112 for opening and closing the flow passage of the purge path 110 may be provided. In this case, the purge path 110 has the same function as the bleed path 46, and the purge valve 112 has the same function as the bleed valve 58. Alternatively, the fuel cell system 10 includes a drain pipe (not shown) for directly discharging the produced water accumulated in the fuel cell stack 12. Further, a stop valve 55 for opening and closing the flow passage of the drain pipe may be provided. The number of discharge paths for discharging anode gas from the anode system apparatus 14 and the number of stop valves 55 included in the fuel cell system 10 are not particularly limited, and three or more may be provided.

As another modification, the fuel cell system 10 includes only one discharge path (e.g., the drain path 54) for discharging anode gas from the anode path 38. Further, one stop valve 55 (e.g., a drain valve 56) for opening and closing the discharge path may be provided. Thus, even if there is only one discharge path, setting the rotational speed of the air pump 68 during the stoppage of traveling to the during-stoppage-of-traveling rotational speed SR set based on the cross-sectional area of the flow path of the drain valve 56 makes it possible to sufficiently dilute the anode gas with the cathode gas. In addition, the during-stoppage-of-traveling rotational speed SR in this case is set to a value greater than the low-load rotational speed LR of the air pump 68 used when the low-load power generation is performed while the moving body 11 is traveling.

A description will be given below concerning technical concepts and effects that are capable of being grasped from the above-described embodiment.

According to an aspect of the present invention, there is provided a fuel cell system 10 provided in a moving body 11, including: a fuel cell stack 12; an air pump 68 configured to supply cathode gas to the fuel cell stack 12; a cathode discharge path 64 through which cathode off-gas is discharged from the fuel cell stack 12; an anode path 38 configured to allow anode gas to flow through the fuel cell stack 12; one or more discharge paths (the bleed path 46, the drain path 54) configured to guide the anode gas of the anode path 38 to the cathode discharge path 64; and a control device (ECU 80) configured to control operation of the air pump 68, wherein the control device is configured to: while the moving body 11 is traveling, supply the cathode gas by rotating the air pump 68 at a low-load rotational speed LR and perform a low-load power generation in the fuel cell stack 12; and in a case where power generation of the fuel cell stack 12 is performed while the moving body 11 is stopped, increase a supply amount of the cathode gas by rotating the air pump 68 at a during-stoppage-of-traveling rotational speed (a travel-stopping rotational speed) SR, which is greater than the low-load rotational speed LR.

With the above configuration, in the fuel cell system 10, adjusting the supply amount of the cathode gas in accordance with a situation of the moving body 11, e.g., during traveling or during stoppage of traveling, makes it possible to discharge the appropriately diluted anode gas to the outside of the moving body 11. In particular, when the moving body 11 is stopped, there is a possibility that an element that causes anode gas to catch fire exists outside the moving body 11. In this case, the fuel cell system 10 rotates the air pump 68 at the during-stoppage-of-traveling rotational speed SR which is greater than the low-load rotational speed. Thus, the cathode gas discharged to the cathode discharge path 64 can sufficiently dilute the anode gas. As a result, the fuel cell system 10 does not require a diluter, and the overall size of the system can be reduced.

The fuel cell system 10 further includes one or more stop valves 55 (drain valve 56, bleed valve 58) configured to switch between a state of allowing flow of the anode gas in the one or more discharge paths (bleed path 46, drain path 54) and a state of stopping flow of the anode gas in the one or more discharge paths. The during-stoppage-of-traveling rotational speed SR of the air pump 68 is set based on a flow path cross-sectional area of the one or more stop valves 55. Thus, setting the during-stoppage-of-traveling rotational speed SR in accordance with the flow path cross-sectional area of the stop valve 55 makes it possible to adjust the supply amount of the cathode gas of the air pump 68 so as to be appropriate for the amount necessary for dilution of the anode gas. Thus, since the fuel cell system 10 does not need to rotate the air pump 68 more than necessary, the efficiency of power generation can be improved.

A plurality of discharge paths (bleed path 46, drain path 54) are provided. Further, each of the plurality of discharge paths is provided with the stop valve 55. The during-stoppage-of-traveling rotational speed SR is set so as to achieve a supply amount of the cathode gas corresponding to a total amount of the anode gas discharged from the plurality of stop valves 55. Thus, even if the plurality of stop valves 55 are opened simultaneously, the supply amount of cathode gas supplied correspondingly to the total amount of anode gas discharged from the plurality of stop valves 55 enables the anode gas to be sufficiently diluted.

The anode path 38 includes an anode supply path 40, an anode discharge path 42, and an anode circulation path 44. The anode supply path 40 supplies anode gas to the fuel cell stack 12. The anode discharge path 42 discharges anode off-gas from the fuel cell stack 12, and further includes a gas-liquid separator 52. The anode circulation path 44 allows the anode off-gas discharged from the gas-liquid separator 52 to circulate to the anode supply path 40. The plurality of stop valves 55 include a drain valve 56 and a bleed valve 58. The drain valve 56 opens and closes a drain path 54, which is one of the discharge paths connected to the gas-liquid separator 52, to discharge the separated water. The bleed valve 58 opens and closes a bleed path 46, which is another one of the discharge paths connected to the anode circulation path 44, to discharge the anode off-gas. Thus, in the fuel cell system 10, even when both the drain valve 56 and the bleed valve 58 are opened due to the abnormality of both the valves, the supply of an appropriate amount of cathode gas enables sufficient dilution of the anode gas.

Further, the control device (ECU 80) can implement a first detection method for detecting a failure of the stop valves 55 while the moving body 11 is traveling and a second detection method for detecting a failure of the stop valves 55 while the moving body 11 is stopped. The detection time required for the first detection method is shorter than the detection time required for the second detection method. As a result, the fuel cell system 10 detects a failure in a short detection time by the first detection method while the moving body 11 is traveling, so that the abnormality of the stop valve 55 can be detected early and the user can be prompted to take necessary measures. On the other hand, the fuel cell system 10 can accurately detect the abnormality of the stop valve 55 by the second detection method which requires a longer time, during the stoppage of traveling of the moving body 11, and can enhance safety while the moving body 11 is traveling.

When a failure of the one or more stop valves 55 is detected while the moving body 11 is traveling, the control device (ECU 80) increases a rotational speed of the air pump 68 after the detection of the failure, to a value greater than a rotational speed of the air pump 68 before the detection of the failure. Thus, even when the fuel cell system 10 detects a failure of the stop valve 55 while the moving body 11 is traveling, the increase in the supply amount of the cathode gas enables the anode gas to be sufficiently diluted.

When a failure of the stop valves 55 is detected, the control device (ECU 80) outputs a valve closing command to the stop valves 55. As a result, the fuel cell system 10 can immediately reduce the discharge of the anode gas when a failure of the stop valves 55 is detected.

Further, while the moving body 11 is traveling after the failure of the stop valves 55 has been detected during stoppage of traveling of the moving body 11, the control device (ECU 80) increases a rotational speed of the air pump 68 after the failure has been detected, to a value greater than a rotational speed of the air pump 68 in a state where the stop valves 55 are not in failure. Thus, the fuel cell system 10 enables the anode gas to be sufficiently diluted even when the stop valve 55 fails while the moving body 11 is traveling, and enables the moving body 11 to be moved as necessary.

What is claimed is:

1. A fuel cell system provided in a moving body, comprising:
    a fuel cell stack;
    an air pump configured to supply cathode gas to the fuel cell stack;
    a cathode discharge path through which cathode off-gas is discharged from the fuel cell stack;
    an anode path configured to allow anode gas to flow through the fuel cell stack;
    one or more discharge paths configured to guide the anode gas of the anode path to the cathode discharge path; and
    a control device configured to control operation of the air pump,
    wherein the control device is configured to:
    while the moving body is traveling, supply the cathode gas by rotating the air pump at a low-load rotational speed and perform a low-load power generation in the fuel cell stack; and
    in a case where power generation of the fuel cell stack is performed while the moving body is stopped, increase a supply amount of the cathode gas by rotating the air pump at a travel-stopping rotational speed, which is greater than the low-load rotational speed.

2. The fuel cell system according to claim 1, further comprising:
    one or more stop valves configured to switch between a state of allowing flow of the anode gas in the one or more discharge paths and a state of stopping flow of the anode gas in the one or more discharge paths,
    wherein the travel-stopping rotational speed is set based on a flow path cross-sectional area of the one or more stop valves.

3. The fuel cell system according to claim 2, wherein:
    the one or more discharge paths comprise a plurality of discharge paths, and each of the plurality of discharge paths is provided with the stop valve; and
    the travel-stopping rotational speed is set so as to achieve a supply amount of the cathode gas corresponding to a total amount of the anode gas discharged from the plurality of stop valves.

4. The fuel cell system according to claim 3, wherein:
    the anode path comprises:
    an anode supply path through which the anode gas is supplied to the fuel cell stack;
    an anode discharge path through which anode off-gas is discharged from the fuel cell stack, the anode discharge path including a gas-liquid separator; and
    an anode circulation path configured to allow the anode off-gas discharged from the gas-liquid separator to circulate to the anode supply path; and
    the plurality of stop valves include:
    a drain valve configured to open and close a drain path, which is one of the discharge paths connected to the gas-liquid separator, to discharge separated water; and
    a bleed valve configured to open and close a bleed path, which is another one of the discharge paths connected to the anode circulation path, to discharge the anode off-gas.

5. The fuel cell system according to claim 2, wherein:
    the control device is configured to:
    perform a first detection method of detecting a failure of the stop valves while the moving body is traveling, and perform a second detection method of detecting a failure of the stop valves while the moving body is stopped; and
    a detection time of the first detection method is shorter than a detection time of the second detection method.

6. The fuel cell system according to claim 2, wherein:
    the control device is configured to:
    when a failure of the one or more stop valves is detected while the moving body is traveling, increase a rotational speed of the air pump after the detection of the failure, to a value greater than a rotational speed of the air pump before the detection of the failure.

7. The fuel cell system according to claim 2, wherein:
    the control device is configured to:
    output a valve closing command to the stop valves when a failure of the stop valves is detected.

8. The fuel cell system according to claim 2, wherein:
    the control device is configured to:
    while the moving body is traveling after a failure of the stop valves has been detected during stoppage of traveling of the moving body, increase a rotational speed of the air pump after the failure has been detected, to a value greater than a rotational speed of the air pump in a state where the stop valves are not in failure.

* * * * *